United States Patent [19]
Cole et al.

[11] 3,738,389
[45] June 12, 1973

[54] DIAPHRAGM VALVES FOR LIQUIDS
[76] Inventors: George S. Cole; Richard L. Ritzenthaler; Don C. Arnold, all of 601 Skokie Boulevard, Northbrook, Ill. 60062

[22] Filed: Aug. 27, 1970
[21] Appl. No.: 67,346

[52] U.S. Cl. ......... 137/636.1, 137/607, 137/636.4, 251/331
[51] Int. Cl. ....................... F16k 11/14, F16k 19/00
[58] Field of Search .................. 137/607, 451, 525, 137/636.1, 636.4; 251/331, 61.1

[56] References Cited
UNITED STATES PATENTS

| | | | |
|---|---|---|---|
| 2,688,342 | 9/1954 | Kehrer | 92/100 |
| 2,842,400 | 7/1958 | Booth et al. | 251/331 X |
| 3,190,312 | 6/1965 | Classen et al. | 251/331 X |
| 3,279,749 | 10/1966 | Fleckenstein et al. | 251/331 |

FOREIGN PATENTS OR APPLICATIONS
1,015,290  9/1957  Germany .......................... 137/625.4

Primary Examiner—Martin P. Schwadron
Assistant Examiner—Richard Gerard
Attorney—Prangley, Clayton, Mullin, Dithmar & Vogel

[57] ABSTRACT

Diaphragm valves for liquids wherein a valve body has a surface recess which receives a resilient valve member of rubber-type material of conforming size. An inlet port from a supply duct and an outlet port to a discharge duct are located in the valve body recess in spaced relation with the recess walls and bottom engaged by the valve member. A retainer holds the valve member in the recess and applies sufficient pressure on the marginal portion of the valve member to establish a liquid-proof seal between the valve member and valve body which exists at least at low liquid pressure. The resilient valve member responds to liquid pressure within the valve, and the seal with the valve body is enhanced in proportion to liquid pressure, giving the valve a self-sealing characteristic over a wide range of liquid pressures. A movable actuator has a cam surface which positions the resilient valve member in relation to the inlet port, closing the port in one position, and in other positions varying the spacing between the valve member and port for varying the rate of flow through the valve. The various parts of the valve, including the actuator, are preassembled economically, and the valve is installed at the point of use as a unit, thereby avoiding any installation step, such as a conventional compression seal, which might permit leakage in the valve.

Two exemplary valves embodying the invention are disclosed. One accommodates a single supply line, while the other accommodates two supply lines (e.g. hot and cold water), and controls the rate and proportion of flow through the valve with a single actuator. In both forms of the invention the liquid handled by the valve flows from supply duct to discharge duct without traversing a region within the valve from which leakage is possible as a result of abuse or improper installation.

Valves embodying the invention easily can be installed by the user without tools of any kind, and the structure involved in installation is such that leakage at the couplings for the supply and discharge lines is virtually impossible.

17 Claims, 34 Drawing Figures

Inventors
GEORGE S. COLE,
RICHARD L. RITZENTHALER,
DON C. ARNOLD
BY Pringly, Clayton,
Mullin, Dithmar & Vogel ATTYS.

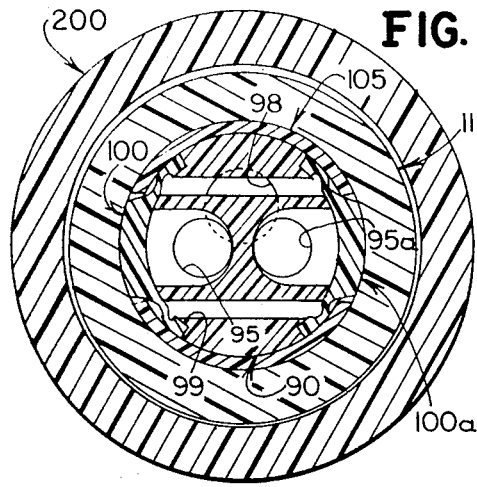
FIG. 14
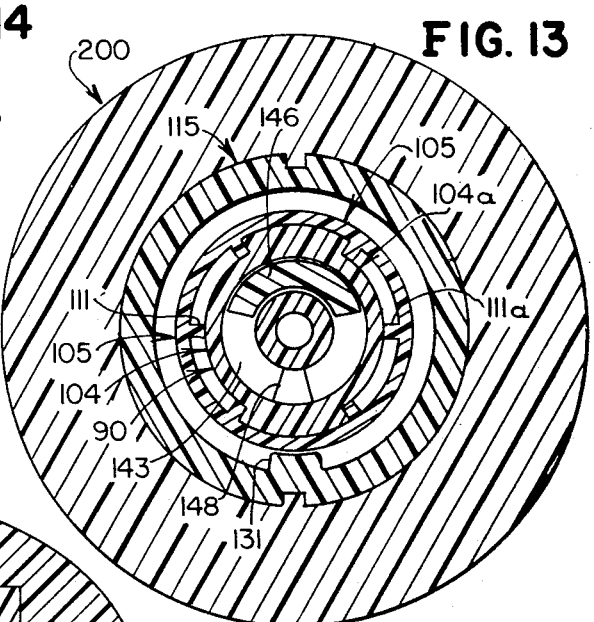
FIG. 13
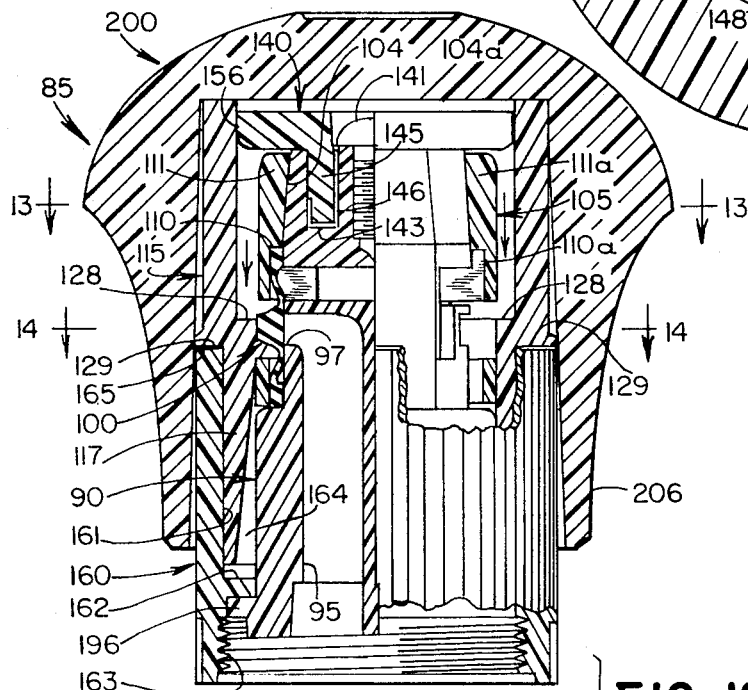
FIG. 12
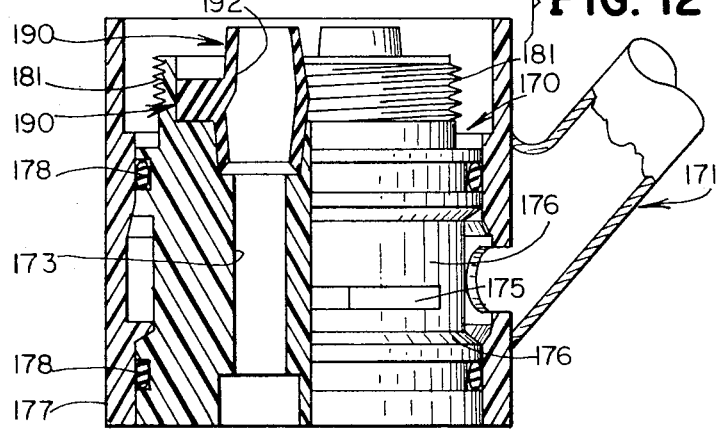

DIAPHRAGM VALVES FOR LIQUIDS

BACKGROUND OF THE INVENTION

This invention relates to diaphragm valves for liquids such as water, and more particularly to diaphragm valves or faucets designed mainly for household use in kitchen, lavatory and bathroom.

The diaphragm valve mechanism of the invention is usable both in a valve or faucet for a single supply line and in a mixing and proportioning valve or faucet for two supply lines. An example of each embodiment of the invention is set forth herein.

Applicants are acquainted with prior proposals and practices in the valve and faucet field, and believe that this invention has no counterpart or suggestion in the prior art.

Proportioning valves developed by one or more of the present applicants are shown in Cole U. S. Pat. No. 3,172,426 and Cole et al. U. S. Pat. No. 3,519,018.

SUMMARY OF THE INVENTION

The invention contemplates a diaphragm valve for liquids which is relatively inexpensive to manufacture, and capable of proper installation by the user. The valve requires virtually no maintenance, and possesses an extended life expectancy. It operates without loss of function over a wide range of fluid pressures.

The valve of the invention is virtually leakproof, and is insensitive to foreign matter in the liquid. Further, the valve is not subject to water hammer, cross flow, back flow, or other shortcomings of the valves in use at the present time.

Although various materials may be used in the valve of the invention, the valve is particularly suited to the use of modern plastic materials which are chemically inert, and subject to economical manufacture and assembly. Such materials, even when used with thin sections, can be expected to have an almost endless life and to possess characteristics which avoid deteriorating wear under conditions of use.

The valve of the invention, both the single line type and the double line type, comprises a valve body having a recess therein, a supply duct and a discharge duct. The supply and discharge ducts respectively have inlet and outlet ports in the recess in spaced relation with the recess walls and the marginal portion of the recess bottom.

A resilient valve member of rubber-type material (rubber or suitable plastic) is contained snugly within the valve body recess, overlying the inlet and outlet ports, and preferably spaced from the inlet port except when sealed over the inlet port to close the valve. The perimeter and bottom margin of the valve member respectively engage the walls and bottom of the recess with a pressure relationship which provides a liquid-proof seal.

In preferred form, the bottom margin of the resilient valve member is an integral continuous ridge which engages the walls and bottom of the recess. This ridge, or the member itself in the absence of the ridge, responds to liquid pressure within the valve, and the seal between the valve member and valve body is enhanced in proportion to the liquid pressure, thereby giving the valve a self-sealing characteristic over a wide range of liquid pressures.

A valve member retainer is mounted on the valve body and engages the valve member with sufficient pressure to establish a pressure relationship between the valve member and the walls and bottom of the recess which provides the liquid-proof seal between the valve member and valve body which exists at least at low liquid pressure.

The valve of the invention also includes a movable actuator which has a cam surface effective in one position of the actuator to cause the valve member to close the inlet port, and in other positions to permit variations in the spacing between the valve member and the inlet port, thereby varying the rate of flow through the valve. Bearing means having fixed relation with the valve body, in some instances being a part of the valve body, are provided for supporting and guiding the movable valve actuator in coaxial relation with the valve body.

The valve body recess which receives the resilient valve member is located in an exterior surface of the valve body in both illustrated forms of the invention. In both instances, the valve body is generally cylindrical, and in the single line valve the recess is in an end surface of the valve body, while in the double line valve the two recesses (one for each line) are in the cylindrical surface.

In the single line valve the valve member retainer overlies the recessed end surface of the valve body and has a plurality of longitudinally extending resilient fingers having inturned ends which are received within a first annular recess in the cylindrical surface of the valve body. The movable actuator overlies the retainer, and similarly has a plurality of longitudinally extending resilient fingers having inturned ends which are received within a second annular recess in the cylindrical surface of the valve body.

The resilient valve member in the single line valve has aligned upper and lower bosses in alignment with the underlying inlet port in the valve body recess, and the retainer has an opening through which the upper boss extends. The cam surface of the actuator engages the upper boss and controls the spacing between the lower boss and the inlet port in response to rotation of the actuator.

The double line valve of the second embodiment of the invention employs two valve body recesses and two resilient valve members of the kind used in the single line valve. Thus, the valve body, which is generally cylindrical, has a pair of spaced recesses in the cylindrical surface, as previously mentioned, and a pair of supply ducts and a discharge duct. The supply ducts terminate in inlet ports, one in each recess, and the discharge duct branches within the body and has a pair of outlet ports, one in each recess. The respective pairs of inlet and outlet ports in the recesses have spaced relation with the walls and the margins of the bottom of the recesses.

Each valve body recess snugly receives a resilient valve member of rubber-type material in overlying relation with the inlet and outlet ports in the recess. As before, the perimeter and bottom margin of each valve member respectively engage the walls and bottom of the associated recess with a pressure relationship providing a liquid-proof seal. Each valve member has an exterior boss in alignment with the underlying inlet port.

Preferably the bottom margin of each valve member is an integral continuous ridge which engages the walls and bottom of the associated recess, which ridges, as mentioned, are responsive to liquid pressure within the valve and thus enhance the liquid-proof seals between the valve members and the valve body in proportion to liquid pressure, thereby giving the valve a self-sealing characteristic.

A valve member retainer mounted on the valve body engages and applies pressure on the two valve members, the pressure cooperating to establish the aforesaid pressure relationship between the valve members and the walls and bottoms of the recesses which establishes the liquid-proof seal. As will be seen later, the valve member retainer of the double line valve includes a pair of shoulders, each of which functions as the fourth wall of the associated valve body recess, the other three walls of each recess being in the valve body itself. This arrangement facilitates the assembly of the valve members in the recesses and the positioning of the retainer to apply predetermined pressure on the valve members.

The double line valve has an actuator which surrounds the valve body and valve members, and is movable axially and rotatably to control the rate of flow and flow proportioning, respectively, between the two supply lines. This actuator has an interior surface which engages the exterior bosses of the valve members and controls the spacing between the valve members and the inlet ports within the recesses. This interior surface of the actuator is cylindrical in a longitudinal region which, when positioned axially to engage the bosses, causes the valve members to close the inlet ports, preventing flow through the valve. The remaining interior surface of the actuator which engages the bosses is a cam surface which, except for a longitudinal segment aligned with a segment of the cylindrical surface, is eccentric and tapers outwardly from the cylindrical surface, thus permitting variations in spacings between the valve members and the inlet ports to control rate of flow and flow proportioning through the inlet ports.

The valve body of the double line valve has suitable guide means for maintaining the actuator in coaxial relation with the valve body. In the illustrated embodiment of the invention this guide means includes two longitudinally spaced bearing surfaces which are fixed with respect to the valve body, and two correspondingly spaced cooperating bearing surfaces on the actuator, one on the exterior of the actuator and the other on the interior of the actuator. The cylindrical and cam surfaces of the actuator which engage the valve members are located between these longitudinally spaced bearing surfaces.

The guide means which provides one of the bearing surfaces for the actuator has the dual purpose of serving as the member which couples the valve to an associated mounting body. An adapter seal member of resilient material is contained snugly in a recess in this mounting body, and the aforesaid coupling guide means establishes engagement between the valve body and the adapter seal member which is effective to couple the parts together in leak-proof manner. The adapter seal member has resilient tubular portions received within tapering mouths of supply and discharge ducts in the valve body and mounting body, providing self-sealing connections.

In more detailed aspect, stop means are provided to limit the range of rotation of the actuator to about 180°, and means also are provided to limit the axial movement of the actuator. These stop means for limiting the rotational and axial movements of the actuator comprise interfering shoulders or the like on parts of the valve which have other and more primary functions.

The exterior surface of the actuator which bears on the guide means coupling member mentioned above has a plurality of circumferentially spaced longitudinal lands which engage interior walls of the coupling member, and the regions between the lands serve as reservoirs for a suitable lubricant which is effective to give adequate lubrication for an extended period. In addition, one of the lands is provided with a resilient boss which takes up slack, if any, and thus compensates for minor dimensional irregularities. The boss also cooperates to establish a desirable frictional relationship between the actuator and the guide means, preventing unwanted axial movement of the actuator due to liquid pressures.

The valves of both embodiments are wholly self-contained, that is, no part of the valve having a critical relationship with any other part of the valve needs to be mounted separately during installation in order to establish the critical relationship. The spaced bearings for the actuator both have fixed relation with the valve body, insuring that the actuator will have proper relation with the valve body and resilient valve members. Further, the relationships between inlet ducts, valve body recess, outlet duct, valve body, resilient valve members, valve member retainer and actuator are such that all possibility for leakage is avoided. There is no way, short of willful destruction, these relationships can be altered during the installation of the valve.

BRIEF DESCRIPTION OF THE DRAWINGS

FIG. 12 is an exploded elevational view, partly in longitudinal section and partly broken away, of the second illustrated embodiment of the invention, namely, a valve for two supply lines which controls the rate of flow through the valve and proportions the flow from the two supply lines.

FIG. 13 is a transverse sectional view on line 13—13 of FIG. 12.

FIG. 14 is a transverse sectional view on line 14—14 of FIG. 12.

DESCRIPTION OF THE PREFERRED EMBODIMENTS

The valve of the invention embodied in a single supply line valve is shown in FIGS. 1–11. This is the type of valve that would be used where a separate valve or faucet is desired for both hot water and cold water, sometimes called a two valve or two handle installation.

Figure 1:
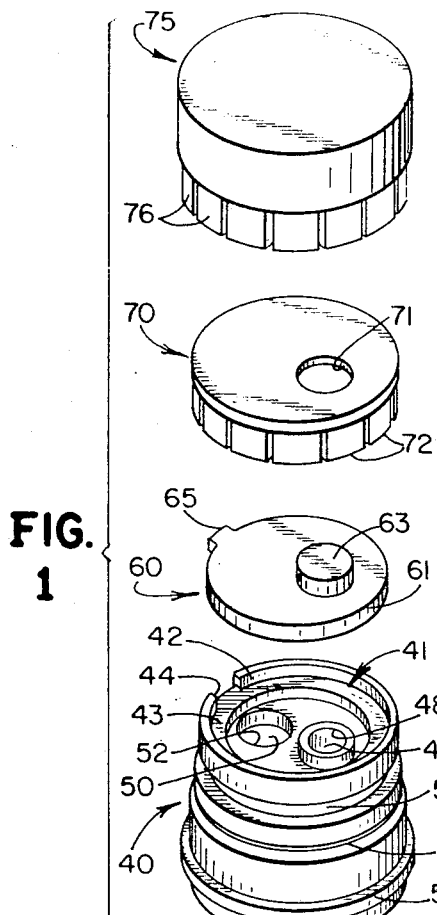
FIG. 1 is an exploded perspective view from above showing the four major elements of the valve of the invention embodied in a single supply line valve.
Figure 2:
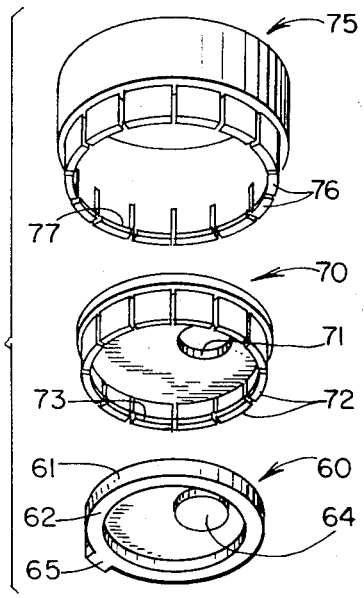
FIG. 2 is an exploded perspective view from below of three of the four elements shown in FIG. 1
Figure 3:
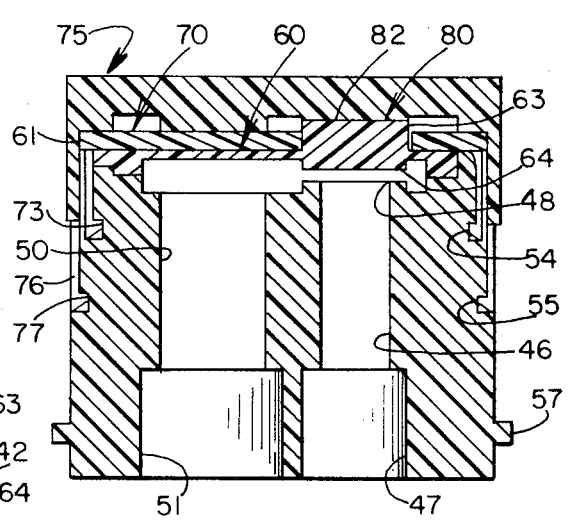
FIG. 3 is a longitudinal sectional view through a single supply line valve embodying the invention, the valve shown in an open condition.
Figure 4:
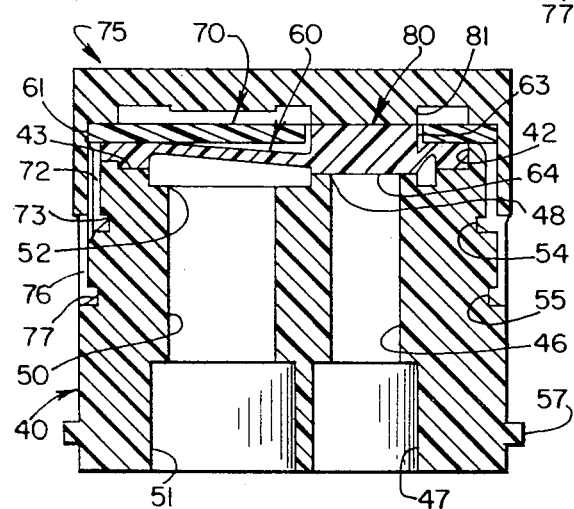
FIG. 4 is a sectional view like FIG. 3 except that the valve is shown in closed condition.
Figure 6:
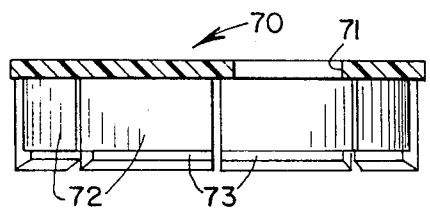
FIG. 6 is a sectional view on line 6—6 of FIG. 5.
Figure 5:
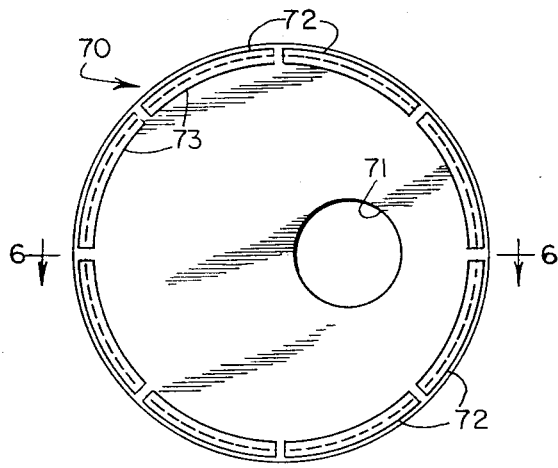
FIG. 5 is a bottom plan view of one element (valve member retainer) used in the valve of FIGS. 1–4.

FIGS. 1 and 2 are exploded perspective views showing the separate parts of the illustrated single line valve, the respective parts being shown assembled in FIGS. 3 and 4, and in greater detail in FIGS. 6–11.

Referring to FIGS. 1, 3 and 4, a valve body 40 is generally cylindrical in shape, and is provided with a recess 41 in the surface of the upper end. Recess 41 has a side wall 42 and a bottom 43, the side wall 42 being relieved to provide a keyway 44 to be mentioned later.

Valve body 40 includes a supply duct 46 (FIGS. 3 and 4) which has an enlarged lower end 47 for connection with a supply line, and an inlet port 48 within recess 41. Body 40 also includes a discharge duct 50 which has an enlarged lower end 51 for connection to a spout (not shown), and an outlet port 52 within recess 41. As shown, supply and discharge ducts 46 and 50 are generally parallel to the cylindrical axis of body 40. In addition, valve body 40 has a first annular recess 54 spaced inwardly from the upper body end and a second annular recess 55 spaced below first recess 54. The purpose of these two recesses will be mentioned later. Also, body 40 has an annular flange 57 near the lower end for coupling the valve to a mounting body (not shown).

A resilient valve member 60 of rubber-type material (natural or synthetic rubber or plastic) is shaped to be received snugly within valve body recess 41 in overlying relationship with inlet and outlet ports 48 and 52, which ports have spaced relationship with the recess wall 42 and adjacent recess bottom 43. The perimeter 61 and the bottom margin 62 (FIG. 2) of valve member 60 respectively engage wall 42 and bottom 43 of recess 41 with a pressure relationship. In preferred form, bottom margin 62 of valve member 60 is an integral continuous ridge, as best shown in FIG. 2, which is particularly responsive to liquid pressure within the valve, effecting a self-sealing characteristic.

In the form of the invention shown, valve member 60 has aligned upper and lower bosses 63 and 64 (FIGS. 1 and 2), and a radial extension 65 which is received in keyway 44 so that bosses 63 and 64 will be aligned properly with inlet port 48.

A valve member retainer 70 overlies and engages valve member 60 and applies pressure thereon which co-operates to establish a pressure-seal relationship between the valve member and the wall and bottom of recess 41 in body 40. Retainer 70 has an opening 71 (FIGS. 1 and 2) through which extends upper boss 63 of valve member 60, as best shown in FIG. 3. Also, retainer 70 has a plurality of longitudinally extending resilient marginal fingers 72, each with an inturned end 73 (FIGS. 3 and 4) received within first annular recess 54 of body member 40. As will be understood, retainer 70 is snapped over the end of valve body 40, and the inturned ends 73 of fingers 72 enter recess 54 and serve to secure the retainer in place with engineered pressure being applied to the marginal regions of valve member 60.

A movable actuator 75 overlies retainer 70 and has a plurality of longitudinally extending resilient marginal fingers 76 with inturned ends 77 received within second annular recess 55. Thus, actuator 75 snaps over the end of valve body 40 and is retained in position in the same manner as retainer 70, and is rotatable on the axis of the valve body.

Figure 10:
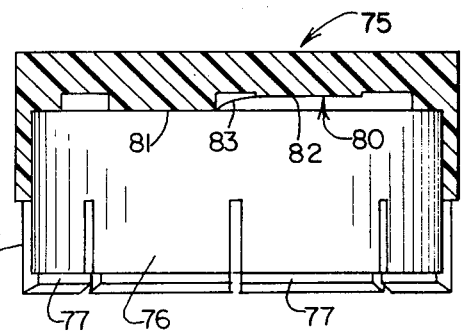
FIG. 10 is a sectional view on line 10—10 of FIG. 9.
Figure 7:
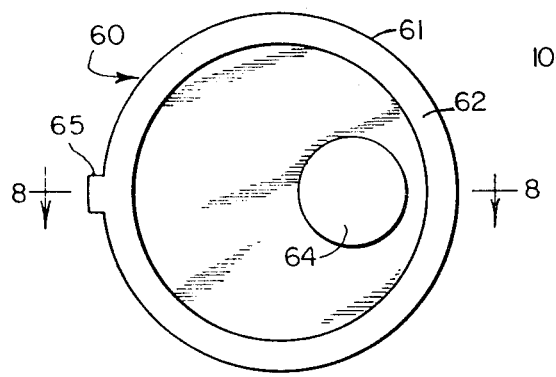
FIG. 7 is a bottom plan view of another element (resilient valve member) used in the valve of FIGS. 1–4.
Figure 9:
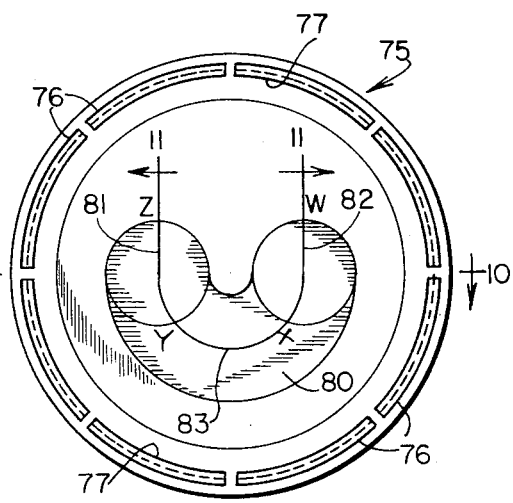
FIG. 9 is a bottom plan view of still another element (movable actuator) used in the valve of FIGS. 1–4.
Figure 11:
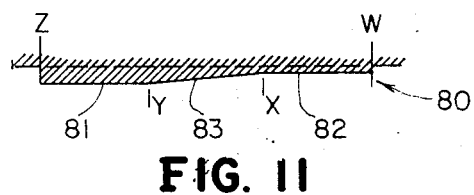
FIG. 11 is a sectional view taken substantially on irregular line 11—11 through points W, X, Y and Z of FIG. 9 showing in linear manner the profile of the cam surface on the member shown in FIGS. 9 and 10.
Figure 8:
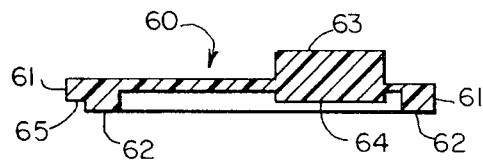
FIG. 8 is a sectional view on line 8—8 of FIG. 7.
Figure 16:
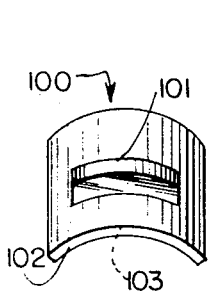
FIG. 16 is a perspective view of the resilient valve member used in the valve of FIG. 12.

Actuator 75 has a cam surface generally designated 80 in FIGS. 3 and 4 and shown in greater detail in FIGS. 9–11. Cam surface 80 is shaded for clarity in FIG. 9, and the linear profile of the cam surface taken on the center line W, X, Y and Z of FIG. 9 is shown in FIG. 11.

The valve shown in FIGS. 1-11 is operated by rotating actuator 75. The valve is closed when portion 81 (FIGS. 9–11) of cam surface 80 opposes boss 63 of valve member 60 and distorts the valve member as shown in FIG. 4 so that lower boss 64 closes supply inlet port 48. The valve is fully open when portion 82 (FIGS. 8–11) of the cam surface is aligned with upper boss 63, as generally shown in FIG. 3. Settings for flow rates between closed and fully opened positions occur when intermediate inclined portions 83 of the cam surface are aligned with upper boss 63. Movement of the closing and opening portion of valve member 60 is in direction normal to the plane of supply inlet port 48.

As shown in FIG. 3, the geometry of the parts is such that valve member 60 when undistorted by actuator 75 has spaced relation with supply inlet port 48, meaning that the valve member is distorted by the actuator both when the valve is closed and when the valve is positioned for intermediate rates of flow.

The single line valve described above is wholly preassembled by the manufacturer prior to sale, and the assembly is not disturbed when the valve is installed. Various arrangements for installing the valve are possible, and, by way of example, valve body 40 may have the aforesaid external coupling flange 57 near the lower end for cooperation with a sleeve (not shown) having an interfering internal flange for coupling to a mounting body (not shown). A coupling sleeve and mounting body are illustrated and described in connection with the double line valve next to be described, and it will be understood that a similar arrangement may be used with the above single line valve.

Figure 31:
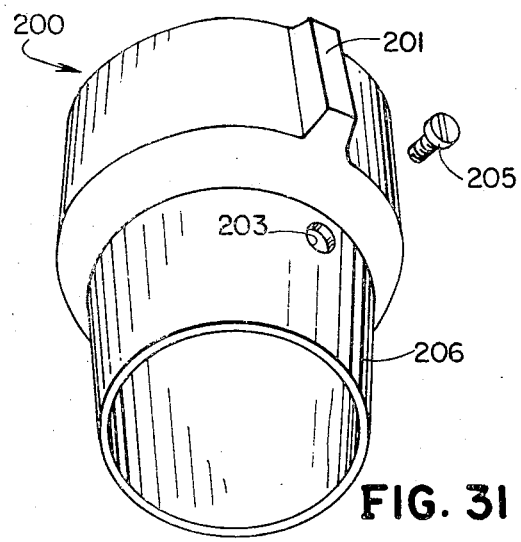
FIG. 31 is a perspective view of the handle used in the valve of FIG. 12.
Figure 32:
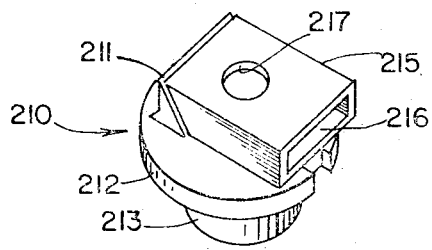
FIG. 32 is a perspective view of a modified stop cap usable in the valve of FIG. 12, the cap having a hinged portion shown closed.
Figure 33:
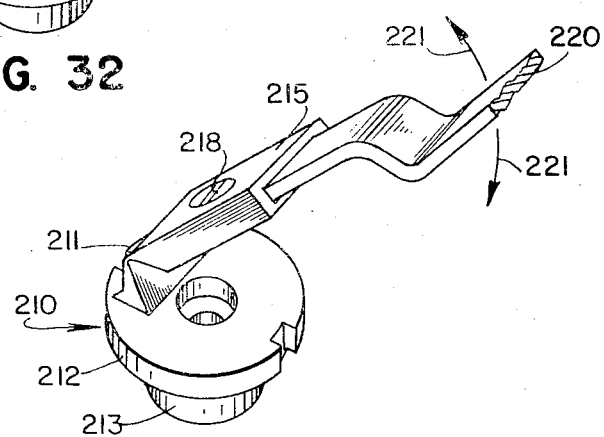
FIG. 33 is another perspective view of the stop cap shown in FIG. 32, a portion of an actuating lever being shown mounted on the hinged portion, shown open.
Figure 34:
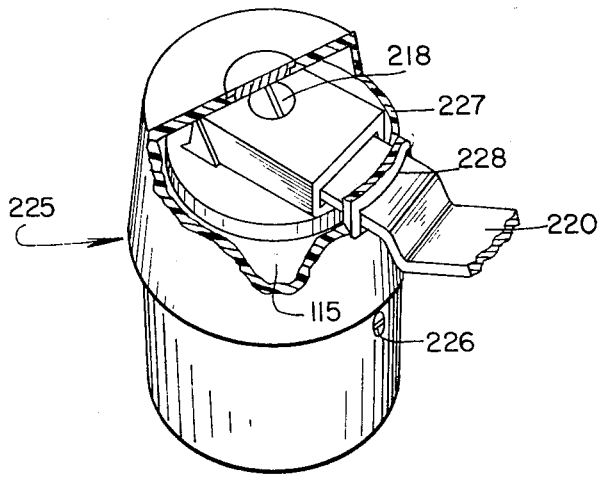
FIG. 34 is a perspective view, partly broken away, of the valve of FIG. 12 using the modified stop cap shown in FIGS. 32 and 33.

A double supply line valve embodying the invention is shown in FIGS. 12–31, and a modified structure for operating the valve is shown in remaining FIGS. 32–34. In general, the double line valve, which proportions and controls the rate of flow from the two supply lines in response to a single actuator and mixes the two liquids, utilizes a pair of the valve mechanisms described above in connection with the single line valve. While there are differences in the shapes of the valve members, the valve member retainer and the movable actuator, the functions of these elements are the same as before, and the elements have the same relationships with the valve body and with each other, as will be seen. The double line valve, like the single line valve, is a wholly self-contained unit, and is subject to installation by the user without disturbing the assembly.

An assembled double line valve embodying the invention is shown in FIG. 12, and details of the various parts of the valve are shown in FIGS. 15–31. FIG. 12 shows the valve per se separated from an associated mounting body which includes a spout, shown by way of example as a swing spout commonly used in kitchen installations.

Referring to FIGS. 12–31, an exemplary double line valve embodying the invention is generally designated 85 in FIG. 12.

Valve 85 includes a valve body generally designated 90, and shown in greater detail in FIGS. 15 and 20–25. Valve body 90 is generally cylindrical in shape, although the surfaces thereof contain irregularities, as will be seen.

Figure 15:
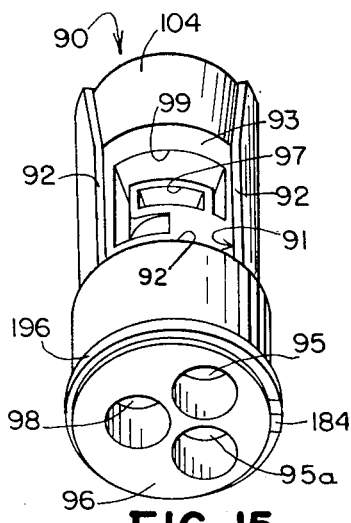
FIG. 15 is a perspective view of the valve body used in the valve of FIG. 12.

Referring first to the perspective view of FIG. 15, valve body 90 has a pair of circumferentially spaced recesses, one of which is shown in FIG. 15 and designated 91. The other and similar recess is oppositely located on body 90, and where illustrated is designated 91a. Recess 91 in body 90 has three recess walls 92, and a recess bottom 93, the latter having the shape of a cylindrical segment. The fourth wall of recess 91, as will be seen later, is a downwardly facing internal shoulder on a retainer member subsequently to be described.

Valve body 90 also has a pair of supply ducts 95 and 95a, arbitrarily called cold water duct 95 and hot water duct 95a, leading from the lower end 96 of the valve body to inlet ports in recesses 91 and 91a. Thus, supply duct 95 terminates in an inlet port 97, preferably generally rectangular in shape in elevational view with the major dimension extending circumferentially of the valve body, located centrally of recess 91, and supply duct 95a similarly terminates in an inlet port 97a in opposite recess 91a. A discharge duct 98 leads from lower end 96 and branches within the valve body, terminating in outlet ports 99 and 99a in and leading from the respective recesses 91 and 91a. As shown, outlet port 99 is larger in size than the associated inlet port 97. The lower ends of ducts 95, 95a and 98 taper outwardly for coupling purposes, as better shown in FIGS. 20 and 25.

A pair of like resilient valve members 100 (FIG. 16) and 100a (FIG. 17) are received snugly within valve body recesses 91 and 91a. These valve members, as before, are made of rubber-type material such as natural or synthetic rubber or plastic. Valve members 100 and 100a have the general shape of a cylindrical segment, and respectively have circumferentially elongated exterior bosses 101 and 101a. When the valve members are positioned in the recesses, the exterior bosses are aligned with the inlet ports 97 and 97a from supply ducts 95 and 95a.

Figure 17:
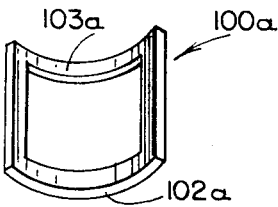
FIG. 17 is another perspective view of the valve member of FIG. 16.

The perimeter 102 and the bottom margin 103 of valve member 100 respectively engage the walls 92 and bottom 93 of recess 91 with a pressure relationship providing a liquid-proof seal. As shown in FIG. 17, the bottom margins 103 and 103a of the valve members are integral continuous ridges which engage the walls and bottom of the associated recesses. These ridges are responsive to liquid pressure within the valve and enhance the liquid-proof seals between the valve members and the valve body in proportion to the liquid pressure, thereby giving the valve a self-sealing characteristic.

Still referring to FIG. 15, portions 104 and 104a of valve body 90 between recesses 91 and 91a and the upper end of the valve body taper toward the body axis and widen circumferentially. The purpose of the taper is to facilitate assembly of valve body 90 with resilient valve members 100 and 100a and the valve member retainer presently to be described. The tapering portions 104 and 104a of valve body 90 are aligned with downwardly facing shoulders on the valve member retainer, which shoulders, as will be seen, constitute the fourth walls of valve body recesses 91 and 91a.

Figure 26:
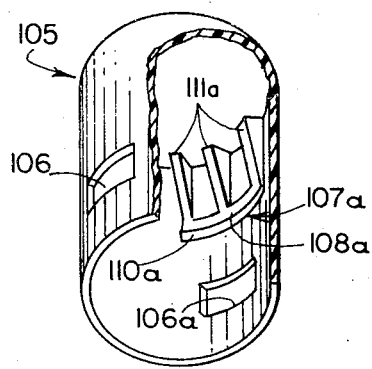
FIG. 26 is a perspective view, partly broken away, of the valve member retainer used in the valve of FIG. 12.

Referring to FIGS. 12–14 and 26, a valve member retainer 105 in the form of a generally cylindrical collar is mounted on valve body 90 in overlying relationship with valve members 100 and 100a. As best shown in FIG. 26, valve member retainer 105 has oppositely disposed openings 106 and 106a through which bosses 101 and 101a of the valve members extend. In spaced relation above openings 106 and 106a are bosses 107 and 107a on the interior surface of retainer 105. Boss 107a is shown in FIG. 26, comprising an arcuate portion 108a having a downwardly facing shoulder 110a, and a counterpart arcuate portion 108 with downwardly facing shoulder 110 (FIG. 12) is diametrically opposite.

When retainer 105 is positioned on body member 90, as shown in FIG. 12, shoulders 110 and 110a have proper relation with valve body recesses 91 and 91a to form the fourth walls of the recesses, thereby providing recesses having four walls which properly contain and confine the valve members, giving the liquid-proof seal with the self-sealing characteristic between the valve members and the valve body.

Still referring to FIG. 26, bosses 107 and 107a on the upper interior surface of retainer 105 also include longitudinally extending portions 111 and 111a which widen in radial dimension from bottom to top. As shown, portions 111 and 111a each include three circumferentially spaced projections, and the widening thereof from bottom to top is complementary to the aforesaid taper of the valve body portions 104 and 104a. Portions 111 and 111a engage portions 104 and 104a when retainer 105 is assembled with valve body 90, as shown in FIGS. 12 and 13.

Valve member retainer 105 engages valve members 100 and 100a with a pressure relationship cooperating to establish the pressure relationship between the valve members and the walls 92, 110, 92a, 110a and bottoms 93, 93a of recesses 91 and 91a in valve body 90. In this manner valve members 100 and 100a are contained and confined within the valve body recesses so that liquid pressure within the valve body effectively may enhance the seals between the valve members and valve body in proportion to the liquid pressure, thereby giving the valve a self-sealing characteristic.

Figure 27:
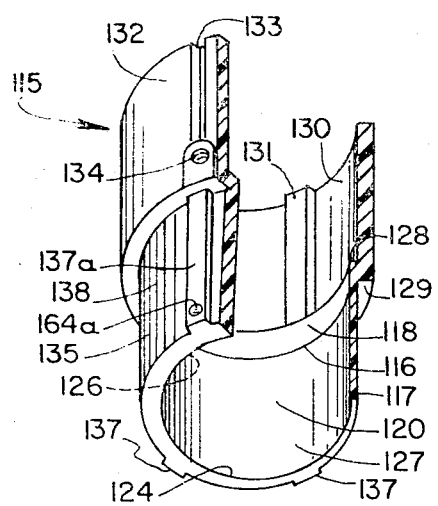
FIG. 27 is a perspective view, partly broken away, of the actuator used in the valve of FIG. 12.
Figure 28:
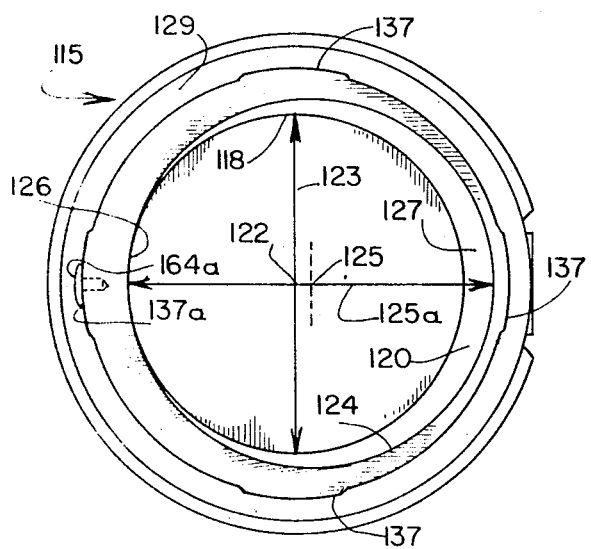
FIG. 28 is an enlarged bottom plan view of the actuator shown in FIG. 27.

Referring to FIGS. 27 and 28, as well as FIGS. 12–14, an actuator 115, generally cylindrical in shape, surrounds valve body 90, valve members 100 and 100a and valve member retainer 105. As will be seen, actuator 115 is movable axially and rotatably to control rate of flow and flow proportioning, respectively, through the valve.

Actuator 115 has an interior surface which engages the exterior bosses 101 and 101a of valve members 100 and 100a, this interior surface being in part cylindrical and in part a cam surface, as will be seen in detail in FIGS. 27 and 28.

Referring to those figures, circular line 116 in FIG. 27 on the interior surface of lower portion 117 of actuator 115 is the dividing line between an upper cylindrical surface 118 and a lower cam surface 120. As best shown in FIG. 28, cylindrical surface 118 is concentric with axis 122 of the actuator, the vertical double arrow 123 through this axis or center 122 representing the diameter of cylindrical surface 118.

In FIGS. 12 and 14, actuator 115 is positioned axially so that cylindrical surface 118 engages bosses 101 and 101a of valve members 100 and 100a, the surface 118 distorting the valve members so the latter are sealed over inlet ports 97 and 97a. In this position of actuator 115, the valve 85 is fully closed.

Lower cam surface 120 (FIGS. 27 and 28) of actuator 115 is a generally divergent surface which connects the lower margin (line 116) of upper cylindrical surface 118 with a longitudinally spaced lower circular portion 124 having a diameter larger than the double arrow 123 diameter of the cylindrical surface. The lower circular portion 124 is eccentric with respect to cylindrical surface 118, the center 125 of circular portion 122 being located on the double arrow 125a diameter which in FIG. 28 is at right angles to the double arrow 123 diameter of cylindrical surface 118.

The left hand end of double arrow 125a bisects a segment 126 of cam surface 120 which is generally aligned with a segment of cylindrical surface 118, this segment 126 of cam surface 120 when in engagement with valve member 100 or 100a being effective in the same manner as surface 118 to distort and seal that valve member over its associated inlet port 97 or 97a of valve body 90, thus blocking the flow through that port. In view of the outwardly tapering shape of surface 127 (FIG. 28) opposite the aligned segment 126, the other valve member tends to assume its undistorted shape and will be spaced from its associated inlet port by the distance permitted by surface 127 of lower cam surface 120. Thus, when one valve member is closed by aligned segment 126 of cam surface 120, the other valve member will be open to an extent depending on the axial position of actuator 115.

It will be understood that when actuator 115 is rotated on its axis away from the position where aligned segment 126 of cam surface 120 engages a valve member, there will be liquid flow through both inlet ports 97 and 97a and both outlet ports 99 and 99a, the proportioning of the respective flows being dependent on the angular or rotational position of the actuator, and the total volume of flow, or rate of flow, being dependent on the axial position of the actuator.

Referring again to FIG. 27, the interior of actuator 115 has an upwardly facing annular shoulder 128 more or less midway between the ends, which shoulder, as will be seen, constitutes one element of a stop arrangement that limits the outward or upward axial movement of the actuator. A downwardly facing annular shoulder 129, also approximately midway between the ends of actuator 115, constitutes one element of a stop arrangement that limits inward or downward movement of the actuator, as will be seen.

The upper interior surface 130 (FIG. 27) of actuator 115 above upwardly facing shoulder 128 is cylindrical, and it is provided with one or more longitudinally extending bosses 131 which serves to key actuator 115 to a rotatable stop cap which will be described later. Also, the exterior upper surface 132 of actuator 115 is cylindrical, and this surface, as shown, has a pair of oppositely disposed longitudinal recesses 133 and 133a, which recesses serve to key actuator 115 with a handle which also will be described later. Threaded openings 134 and 134a are provided in actuator 115 for receiving a set screw passing through the handle.

Still referring to FIGS. 27 and 28, the lower exterior surface 135 of actuator 115 is generally cylindrical in shape, the surface 135 preferably having a plurality of circumferentially spaced longitudinal lands 137 which, as will be seen, cooperate to insure proper operation of actuator 115. The lands 137 maintain friction and operational binding in the operation of actuator 115 within desired limits. The lower exterior surface 135 of actuator 115 between lands 137 may have grooves 138 which, as will be seen later, serve as reservoirs for a lubricant.

Figure 29:
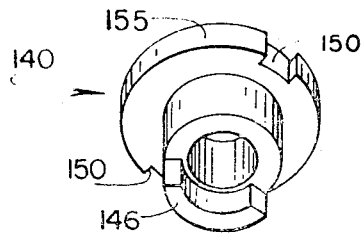
FIG. 29 is a perspective view of the stop cap used in the valve of FIG. 12, the stop cap serving both to limit rotation of the actuator and as a guide and bearing means for maintaining the actuator in coaxial relation with the valve body.

Referring now to FIGS. 12, 13 and 29, a stop cap 140 is rotatably secured to the upper end of valve body 90 by suitable means such as a centrally located screw 141 (FIG. 12). The upper end of valve body 90 has an annular recess 143, best shown in FIG. 13, surrounding screw 141, and stop cap 140 has a downwardly extending tubular portion 145 received within this annular recess.

An arcuate stop boss 146 (FIGS. 13 and 29) extends downwardly from tubular portion 145 and terminates short of the bottom of recess 143. An interfering stop boss 148 (FIG. 13) is provided at the bottom of recess 143, and the bosses 146 and 148 cooperate to limit the extent to which actuator 115 may be rotated in either direction, as will be seen. The illustrated stop bosses 146 and 148 are sized to permit actuator rotation through a range of about 180°.

Stop cap 140 has oppositely located peripheral recesses 150 (FIG. 29) which receive the longitudinal bosses 131 (FIG. 27) on the upper interior surface 130 of actuator 115. Thus, stop cap 140 and actuator 115 are keyed together for joint rotation, and the range of rotation, as mentioned above, is established by the interference between boss 146 on stop cap 140 and boss 148 on valve body 90.

In some situations it will be desirable to mount a pair of valves 85 in back-to-back relation, and it will be convenient to connect the hot water line to supply ducts on the same sides of the two valves and the cold water line to the supply ducts on the other sides of the valves. The opposing peripheral recesses 150 in the stop cap 140 permits actuator 115 to be oriented in either of two positions, the positions differeing by approximately 180°. Thus, in a back-to-back installation, the actuators 115 on the two valves may be given reverse orientation, whereby the two valves will operate properly despite non-uniformity as between the respective hot and cold water supply ducts, and without special parts.

An important feature of the invention relates to the means provided for guiding actuator 115 in proper coaxial relation with valve body 90. In the illustrated valve 85, two guide means are provided for actuator 115, the two guide means being spaced axially to insure there will be no tilting and binding of actuator 115 during operation.

One of the aforesaid guide means is the peripheral surface 155 (FIG. 29) of stop cap 140 which is engaged by the upper interior cylindrical surface 130 (FIG. 27) of actuator 115. The assembled relationship of the stop cap and actuator is shown in FIG. 12, the engagement between these two guiding and bearing surfaces being generally designated 156.

Two functions performed by stop cap 140 have been mentioned, namely, cooperating to limit the range of rotation of actuator 115, and providing one of the guide means for maintaining actuator 115 in coaxial relation with valve body 90. A third function performed by stop cap 140 is to limit the outward axial movement of actuator 115. This is accomplished by interference between upwardly facing shoulder 128 on the interior of actuator 115 and the peripheral portion of stop cap 140. Referring to FIG. 12, as actuator 115 is moved upwardly, shoulder 128 will engage stop cap 140, preventing further upward movement. Thus, stop cap 140 performs three important functions in valve 85.

Figure 30:
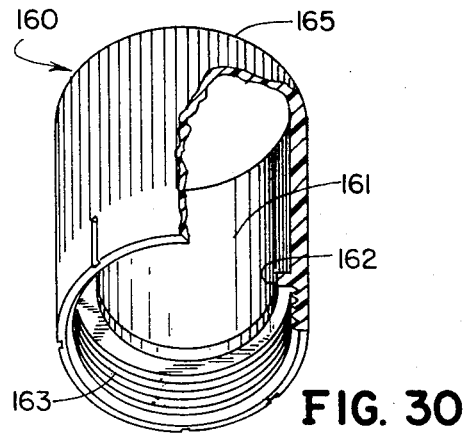
FIG. 30 is a perspective view, partly broken away, of the coupling member used in the valve shown in FIG. 12 for connecting the valve to the mounting body, the coupling member also serving as another guide and bearing means for the actuator.

Referring to FIGS. 12 and 30, a second guide means for actuator 115, spaced axially from stop cap 140, is a cylindrical sleeve 160 which, like stop cap 140, performs three important functions in valve 85. As shown in FIG. 30, cylindrical sleeve 160 has an upper interior cylindrical surface 161, an annular flange 162 below the cylindrical surface, and interior threads 163 below flange 162. The functions of flange 162 and threads 163 will be mentioned later.

When cylindrical sleeve 160 is assembled with valve body 90, as shown in FIG. 12, the two are concentric, and sleeve 160 surrounds the lower portion of valve body 90 in spaced relation therewith. Lower portion 117 of actuator 115 occupies the annular space 164 between valve body 90 and sleeve 160, the lands 137 on the exterior surface of portion 117 having bearing relation with interior cylindrical surface 161 of sleeve 160. Thus, actuator 115 is guided for axial and rotational movements in areas both above and below valve members 100 and 100a, meaning that despite operational stresses on actuator 115 the proper coaxial relation between actuator and valve body is maintained. As previously mentioned, the lands 137 on actuator 115 and the lubricant in the areas between lands cooperate to provide a desirable frictional relationship between actuator 115 and sleeve 160.

Dimensional or geometrical irregularities, if any, in the bearing surfaces of actuator 115, stop cap 140 and coupling sleeve 160 tend to produce a slight non-concentricity between the actuator and valve body 90, especially when the actuator is in valve-open positions. Thus, for example, when one inlet port is closed by action of cylindrical surface 126 in the cam surface region 120, and the other port is open, forces on the actuator tend to shift or tilt the actuator slightly out of concentricity, allowing flow through the "closed" port. This condition, sometimes called cross flow, is objectionable.

While this condition might be avoided with close control of the dimensions of the parts (within the limitations of plastic molding), a more economical expedient is used, which at the same time produces additional important advantages. This expedient, therefore, permits the use of parts made with more relaxed tolerances.

Referring to FIGS. 27 and 28, land 137a on the exterior surface of the lower portion 117 of actuator 115 carries an inset member 164a of resilient frictional material, such as relatively soft polyurethane, which member extends slightly above the surface of land 137a (FIG. 28) and thus engages the interior surface 161 (FIG. 30) of cylindrical sleeve 160. Member 164a serves to take up any slack existing between actuator 115, stop cap 140 and cylindrical sleeve, and prevents objectionable shifting or tilting of actuator 115 by forces acting on the actuator. Since member 164a is located on land 137a which is adjacent cylindrical surface 126 of the cam surface, surface 126 when positioned to close an inlet port is held in proper relation with the valve member, and crossflow is prevented.

Inset member 164a also cooperates to establish a desirable frictional relation between actuator 115 and cylindrical sleeve 160 which helps prevent unwanted axial movement of actuator 115 due to forces derived from the pressure of the liquid in the valve.

Referring again to FIG. 12, upper end 165 of cylindrical sleeve 160 has interfering relation with downwardly facing exterior shoulder 129 of actuator 115, thereby providing a stop limiting the downward or inward axial movement of actuator 115. Upper end 165 of sleeve 160 and shoulder 129 of actuator 115 are shown in substantial engagement in FIG. 12.

Figure 19:
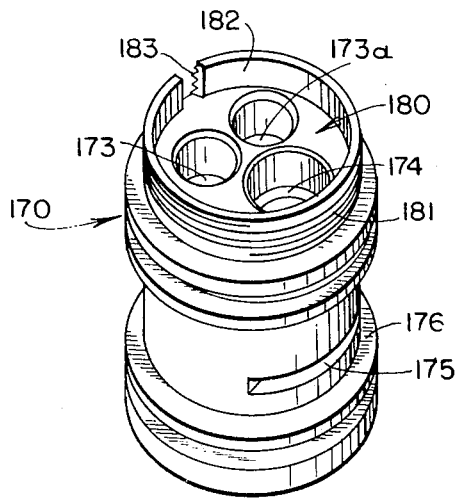
FIG. 19 is a perspective view of the mounting body used with the valve of FIG. 12.
Figure 22:
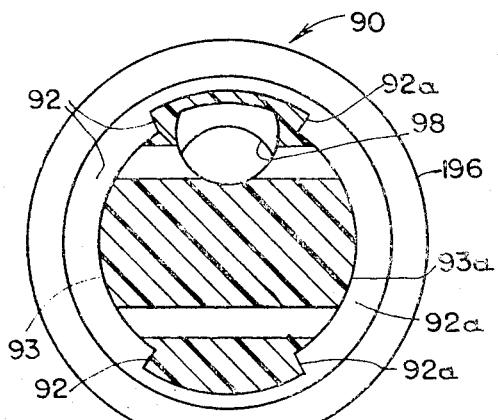
FIG. 22 is a transverse sectional view on line 22-22 of FIG. 20.
Figure 21:
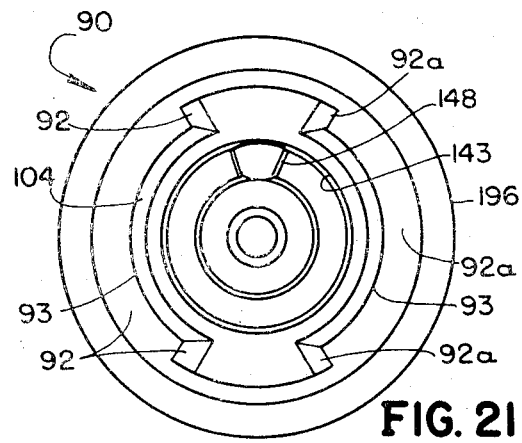
FIG. 21 is a top plan view of the valve body shown in FIG. 20.
Figure 25:
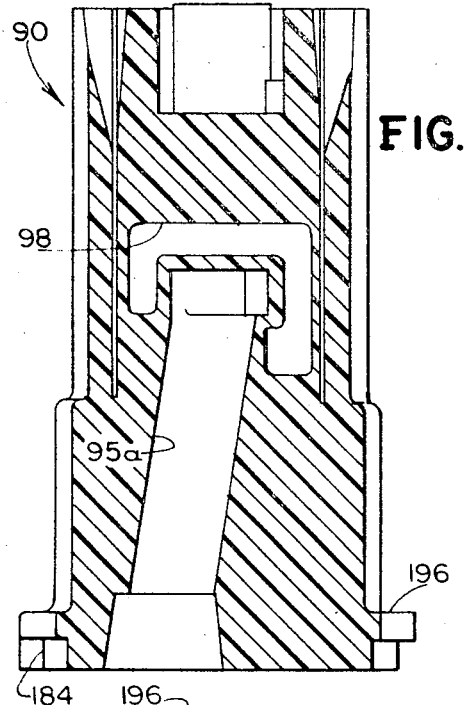
FIG. 25 is a longitudinal sectional view of the valve body taken generally on line 25—25 of FIG. 20.
Figure 20:
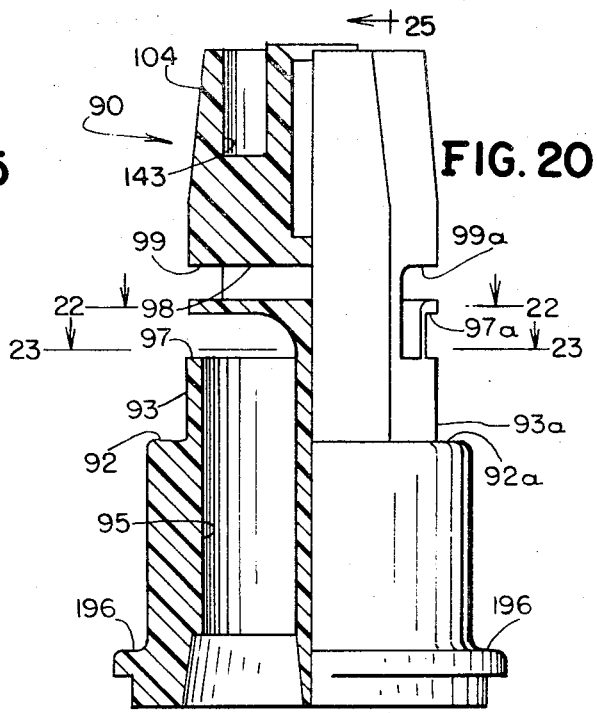
FIG. 20 is a side elevational view, partly in section on line 20—20 of FIG. 24, of the valve body of FIG. 15.
Figure 23:
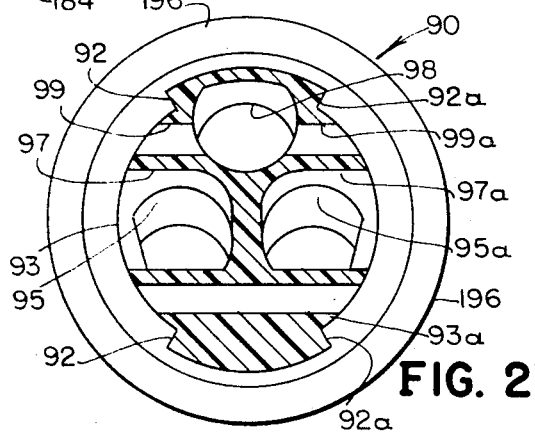
FIG. 23 is a sectional view on line 23—23 of FIG. 20.
Figure 24:
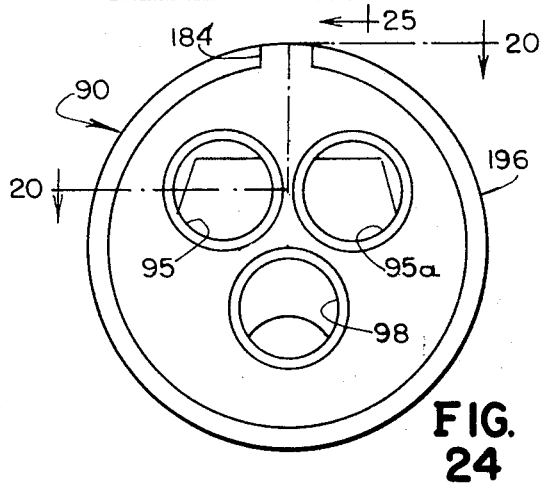
FIG. 24 is a bottom plan view of the valve body shown in FIG. 20.

Referring now to the lower portion of FIG. 12 and FIG. 19, a mounting body for the previously described parts of double line valve 85 is generally designated 170. A conventional swing spout 171 is shown in association with mounting body 170 in FIG. 12, whereas in FIG. 19 a spout is omitted for clarity.

Referring to FIG. 19, the illustrated mounting body 170 is generally cylindrical in shape and provided with internal supply ducts 173 and 173a and a discharge duct 174. The two supply ducts connect with supply lines in conventional manner, and discharge duct 174 has an outlet port 175 in the bottom of an exterior annular recess 176 in mounting body 170. Sleeve portion 177 (FIG. 12) of spout 171 overlies recess 176, and the space within the recess and sleeve portion 177 constitutes a collection and mixing chamber for the liquid passing from discharge outlet port 175 to the spout. Conventional O-rings 178 provide seals for this space and permit rotation of spout 171.

The upper end of mounting body 170 has a circular recess 180, the ducts 173, 173a and 174 terminating at their upper ends in this recess. The upper end portions or mouths of the respective ducts taper outwardly toward the upper ends, as best shown in FIG. 12. External threads 181 are provided at the upper end of mounting body 170 for cooperation with the internal threads 163 of cylindrical coupling sleeve 160. The lateral wall 182 of recess 180 is relieved to provide a keyway 183 which receives a projection 184 (FIG. 15) on the lower end of valve body 90 to insure proper alignment between valve body 90 and mounting body 170 when the two are coupled together.

Figure 18:
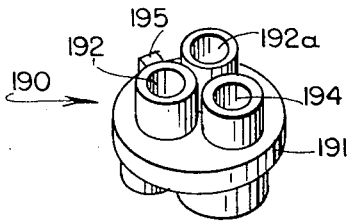
FIG. 18 is a perspective view of the resilient adapter seal member used to couple the valve of FIG. 12 to a mounting body, also shown in FIG. 12.

Referring to FIGS. 12 and 18, a resilient adapter seal member 190 of rubber-type material is disposed between the lower end of valve body 90 and mounting body 170. Adapter seal member 190 has a circular portion 191 snugly contained within recess 180 of mounting body 170, supply ducts 192 and 192a and a discharge duct 194. Circular portion 191 has a radial projection 195 which also is received in keyway 183 of mounting body 170 to insure proper orientation. The respective ducts have upper and lower extensions integral with circular portion 191 which respectively are received within the tapering mouths of ducts 95, 95a and 98 of valve body 90 and the tapering mouths of ducts 173, 173a and 174 of mounting body 170. Supply duct 192 of adapter seal member 190 is shown in FIG. 12 in assembled relation with supply duct 173 of mounting body 170, and it will be understood that the other ducts have similar coupled relationships.

When valve 85 per se is coupled to mounting body 170 by engagement of threads 163 on cylindrical coupling sleeve 160 and threads 181 on mounting body 170, the threads are tightened in sufficient amount so that the lower end of valve body 90 applies light pressure to adapter seal member 190, whereby the respective ducts in valve body 90, adapter seal member 190 and mounting body 170 are connected in leak-proof manner. The aforesaid pressure, of course, is transmitted from internal flange 162 of coupling sleeve 160 to interfering external flange 196 (FIGS. 12, 19 and 25) at the lower end of valve body 90.

Completing the description of valve 85, FIGS. 12–14 and 31 show a handle 200, previously mentioned, which is secured rigidly to actuator 115 and thus is effectively a part of the actuator. Handle 200, as shown in FIGS. 12 and 31, is generally tubular in shape, and closed at its upper end which overlies the upper end of actuator 115, stop cap 140 and valve body 90. An exterior projection 201 (FIG. 31) may be provided for convenience in indexing the rotational position of handle 200.

The upper interior surface of handle 200 may have a longitudinal rib (not shown) for keying into longitudinal recess 133 on the upper exterior surface 132 of actuator 115, and an opening 203 is provided in the lateral wall of the handle for a set screw 205 which engages threaded opening 134 of actuator 115. Skirt 206 of handle 200 surrounds the region between the upper end 165 of cylindrical coupling sleeve 160 and actuator 115 for all axial positions of the actuator, thereby enhancing the appearance of valve 85 in use.

A modified stop cap and handle providing operation of the valve by means of a lever are shown in FIGS. 32–34. Lever operation is particularly desirable in kitchen installations.

Referring to FIGS. 32 and 33, a modified stop cap 210 is formed of desirable plastic material with an integral hinge generally designated 211. Circular portion 212 and downwardly extending sleeve 213 of stop cap 210 are substantially the same as in previously described stop cap 140 (FIG. 29) except that stop boss 146 may be, and is shown, omitted.

Integral hinge 211, which constitutes plastic material of reduced cross section, connects circular portion 212 with a coupling portion 215 which receives one end of an actuating lever 220. Coupling portion 215 has a recess 216 which receives the end of lever 220, and an opening 217 for a screw 218 (FIGS. 33 and 34) which secures lever 220 to coupling portion 215. Hinge 211, of course, permits lever 220 to be moved up and down, as indicated by arrows 221 in FIG. 33.

Referring to FIG. 34, a modified counterpart handle 225 is mounted, as before, rigidly on actuator 115 and secured by set screw 226. Wall 227 of handle 225 has an opening 228 through which extends lever 220. It will be understood that handle 225 first is mounted on actuator 115, and thereafter lever 220 is passed through opening 228 and secured within coupling portion 215 of stop cap 210. With this arrangement, actuator 115 and handle 225 are rotated for proportioning the flow from the two supply lines by moving lever 220 from side to side, and moved axially for adjusting rate of flow by raising and lowering lever 220, the lever bearing alternately on upper and lower walls of handle opening 228. The raising and lowering, of course, involves relative movement of lever 220 with respect to handle 225, as will be understood.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A double supply line valve for two fluids of different characteristics such as hot and cold water, comprising:
   a generally cylindrical valve body having a pair of spaced recesses in the exterior cylindrical surface and a pair of supply ducts and a discharge duct, said supply ducts terminating in inlet ports one in each recess and said discharge duct branching within the body and having a pair of outlet ports one in each recess, said inlet and outlet ports in spaced relation with the walls of said recesses;

a pair of resilient valve members of rubber-type material one in each said recess and overlying said inlet and outlet ports therein, the perimeter and bottom margin of each valve member respectively engaging the walls and bottom of the associated recess with a pressure relationship providing a liquid-proof seal, each valve member having an exterior boss in alignment with the underlying inlet port, said valve members responsive to liquid pressure within said valve body to enhance said seals between said valve members and said valve body in proportion to the liquid pressure, thereby giving the valve a self-sealing characteristic;

a valve member retainer mounted on said valve body and engaging said valve members with a pressure relationship cooperating to establish said pressure relationship between said valve members and the walls and bottoms of said recesses;

an actuator surrounding said valve body and said valve members and movable axially and rotatably to control rate of flow and flow proportioning, respectively, said actuator having an interior surface engaging the exterior bosses of said valve members, said interior surface cylindrical in a longitudinal region which when positioned axially to engage said bosses causes said valve members to close said inlet ports, the remaining interior surface for engaging said bosses being a cam surface which, except for a longitudinal segment aligned with a segment of said cylindrical surface, is eccentric and tapers outwardly from said cylindrical surface to permit variations in spacings between said valve members and said inlet ports and thus control rate of flow and flow proportioning through said inlet ports; and guide means on said valve body for maintaining said actuator in coaxial relation with said valve body.

2. The combination of claim 1 wherein said bottom margin of each said resilient valve member is an integral continuous ridge which engages said walls and bottom of the associated recess, said ridges responsive to liquid pressure within the valve.

3. The combination of claim 1 wherein said cam surface of said actuator, except for said cylindrical longitudinal segment, is defined by the surface connecting said cylindrical surface to a longitudinally spaced circular portion having a diameter larger than the diameter of said cylindrical surface, said circular portion eccentric with respect to said cylindrical surface, the center of said circular portion located on a diameter aligned with the diameter of said cylindrical surface through said segment thereof.

4. The combination of claim 1 wherein said resilient valve members when undistorted by a cylindrical surface of said actuator have spaced relation with said inlet ports, whereby said ports are open for flow therethrough.

5. The combination of claim 1 wherein said valve member retainer is a cylindrical collar surrounding said valve body and said valve members, said collar having a pair of spaced apertures through which said bosses of said valve members extend, said actuator surrounding said cylindrical collar.

6. The combination of claim 5 wherein said collar has a pair of spaced interior shoulders which respectively provide one wall of each valve body recess, the valve body portions aligned with said shoulders tapering in converging manner toward the upper end of said valve body, facilitating assembly of said valve members with said valve body and said collar.

7. The combination of claim 5 with the addition of a stop cap detachably and rotatably secured to the upper end of said valve body, means on said cap and body limiting the rotation of said cap to less than one revolution, the diameter of said cap larger than the outer diameter of said collar, said actuator having an upwardly facing internal annular shoulder of average diameter smaller than the diameter of said cap, whereby interference between said shoulder and said cap limits the outward axial movement of said actuator, and means keying said cap and actuator together for joint rotational movement, said guide means for maintaining said actuator in coaxial relation with said valve body including bearing engagement between an interior surface of said actuator and the perimeter of said stop cap.

8. The combination of claim 7 with the addition of an actuating lever pivoted to said stop cap and the addition of a handle secured to aaid actuator, said lever extending through an aperture in said handle whereby said handle and actuator are moved axially by pivoting said lever and rotated by moving said lever from side to side.

9. The combination of claim 1 with the addition of a mounting body having a pair of supply ducts and a discharge duct, and wherein said guide means for maintaining said actuator in coaxial relation with said valve body includes a cylindrical sleeve surrounding longitudinal portions of said valve body, said actuator and said mounting body, said sleeve having an interior annular flange inwardly of the lower sleeve end, said valve body having an exterior annular flange adjacent the lower end thereof, said interior and exterior annular flanges interfering with each other whereby said cylindrical sleeve is adapted to couple said valve body to said mounting body, said actuator having bearing relation with the interior wall of said cylindrical sleeve.

10. The combination of claim 9 wherein said cylindrical sleeve and said mounting body have cooperating coupling threads.

11. The combination of claim 9 wherein said actuator has a downwardly facing exterior annular shoulder intermediate its ends, said shoulder adapted to engage the upper end of said cylindrical sleeve to limit inward axial movement of said actuator.

12. The combination of claim 9 wherein said longitudinal portion of said actuator received within said cylindrical sleeve has a plurality of circumferentially spaced longitudinal lands bearing on the interior wall of said sleeve, whereby friction and operational binding between actuator and sleeve are maintained within desired limits.

13. The combination of claim 1 with the addition of a lubricant between said cylindrical sleeve and said actuator in the regions between said longitudinal lands.

14. The combination of claim 12 with the addition of an insert member of resilient frictional material in a longitudinal land of said actuator, said land adjacent said interior cam surface containing said longitudinal segment aligned with a segment of said cylindrical surface, said insert member extending slightly above the exterior surface of said land and into engagement with the interior wall of said cylindrical sleeve, serving to take up any slack existing between said actuator and said cylindrical sleeve, whereby cross flow within the valve due to slight non-concentricity between said actuator and valve body is prevented, and insuring against axial movement of said actuator due to pressure of liquid in the valve.

15. The combination of claim 9 with the addition of a resilient adapter seal member disposed between the lower valve body end and said mounting body, said adapter seal member containing supply and discharge ducts connecting with counterpart ducts in said valve and mounting bodies, said cylindrical sleeve in performing its coupling function applying sealing pressure to said adapter seal member whereby the respective ducts are connected in leak-proof manner.

16. The combination of claim 1 with the addition of an insert member of resilient frictional material in the exterior surface of said actuator adjacent said interior cam surface, said insert member extending slightly above said exterior surface and into engagement with said guide means, serving to take up any slack existing between said actuator and said guide means, and insuring against axial movement of said actuator due to pressure of the liquid in the valve.

17. The combination of claim 16 wherein said insert member is located adjacent said interior cam surface containing said longitudinal segment aligned with a segment of said cylindrical surface, whereby cross flow within the valve due to slight non-concentricity between said actuator and said valve body is prevented.

* * * * *